3,190,757
PREPARING A FLUFFED PRODUCT FROM MAPLE SUGAR SYRUP

Joseph C. Underwood, Sr., Plymouth Meeting, and Aaron E. Wasserman, Philadelphia, Pa., assignors to the United States of America as represented by the Secretary of Agriculture
No Drawing. Filed Sept. 21, 1962, Ser. No. 225,401
1 Claim. (Cl. 99—139)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to novel food products, and particularly relates to food products prepared from maple syrup and other sugar syrups.

Maple products such as "maple cream" and "maple butter" have been made in limited amounts for many years. Commercialization of such a product has been hampered by the disadvantages of instability, that is, the bleeding of the suspending syrup from the sugar crystals; a sweetness which many people consider excessive; and a relative high cost per volume of product.

We have discovered a method for preparing fluffed maple products in which the foregoing disadvantages have been, for all practical purposes, overcome. The new products qualify for commercial production as a topping for ice cream, cake or other comestibles, as an icing for bakery products, as a spread, or as a confection. We have also discovered that the novel process of this invention may be applied to other sugar syrups.

In general according to the present invention the fluffed products are prepared by heating a mixture comprising about 75 parts sugar, about 25 parts water, and about 1 part of a substantially pure monoglyceride selected from the group consisting of monoglycerides of saturated and unsaturated $C_{12}$ to $C_{20}$ monocarboxylic fatty acids and mixtures thereof, for a time sufficient to dissolve all the sugar and to a temperature sufficient to melt all the monoglyceride, and blending the mixture with incorporation of air until the desired consistency is obtained.

Maple products prepared according to the present invention are stable enough to have a good shelf life, the fluffed product is much smoother in texture than "maple cream" and is less sweet to the taste, and the maple flavor appears to be enhanced.

Whereas "maple cream" can be prepared only with difficulty from maple syrup having invert sugar in excess of 2%, the fluffed product can be prepared from all maple syrups regardless of content of invert sugar and is as readily applicable to lower grade (darker) syrups as to the best grade syrups.

In addition to maple syrups, the fluffed products have been prepared from commercial (corn) syrup which contains invert sugar, and from sucrose-water syrups. These syrups may be flavored as desired to provide a variety of fluffed products.

While a syrup of about 75% sugar content is typically prepared by concentrating a syrup of lower sugar content, as by heating maple syrup to 16 or 17° F. above the boiling point of water, the syrups to be employed in making the fluffed products of the present invention may be prepared by other procedures, such as by combining the proper ratio of sugar and water and dissolving the sugar, or by dissolving sugar in a syrup of less than 75% sugar content.

As will be obvious to those skilled in the art, the characteristics of the fluffed product may be adapted to the desired use by slight adjustments in variables as the exact concentration of sugar, the ratio of sucrose to total sugars, and the blending conditions. As an illustration, the syrup of Example 2 has a somewhat higher (approaching 76%) concentration of sugar than the syrup of Example 1. Whereas the latter is considered more suitable as a topping, the product of Example 2 makes an excellent icing. In general, an increase in levulose in the syrup is conducive to properties associated with toppings. The blending should be performed at a temperature slightly above the melting point of the monoglyceride. Using a high speed mixer, only 2 to 5 minutes is required to incorporate air and produce a smooth-textured, fluffed product.

The monoglyceride used in the examples was prepared from hydrogenated lard and is considered a substantially pure monoglyceride because of its average of one fatty acid per glyceride unit and because of its relatively narrow range of molecular weight. Although somewhat larger proportions of the monoglyceride preparation may be combined in the mixture, we prefer to use only about 1% since that is sufficient for the preparation of the fluffed products. The fluffed products cannot be obtained, however, when a triglyceride preparation is substituted for the monoglyceride preparation.

The monoglycerides may be prepared from any of the edible fats and oils such as lard, cottonseed oil, safflower oil, sesame oil, peanut oil, soybean oil, corn oil, etc., or from these same fats and oil which have been hydrogenated. From a practical consideration mixtures of monoglycerides will be used in preference to individual monoglycerides such as glycerine monopalmitin or glycerine monostearin.

When the monoglycerides are prepared from oils containing unsaturated fatty acids, particularly polyunsaturated fatty acids such as linoleic acid, it is desirable to include in the syrup-monoglyceride mixture an antioxidant selected from those approved for use in edible fats.

Examples 1 to 3 illustrate the preparation of fluffed products from maple syrup.

EXAMPLE 1

*Maple topping.*—Eight hundred grams of a #1 grade maple syrup was heated and concentrated until the boiling point was 16° F. above the boiling point of water. As the concentrate was cooling, 8 grams of a monoglyceride preparation was added with stirring. When the mixture reached a temperature of about 155° F., it was blended with a commercial kitchen mixer operating at high speed. In two minutes the mixture had become a smooth, creamy, light-brown colored, fluffed product. Blending was continued for three more minutes to insure uniform consistency of the product.

EXAMPLE 2

*Maple icing.*—Eight hundred grams of maple syrup from the same source as Example 1 was concentrated until the boiling point was 17° F. above the boiling point of water. While the concentrate was cooling, 8 grams of the monoglyceride preparation was added with gentle stirring. When the mixture reached a temperature of 155° F., it was blended for 5 minutes at high speed with a commercial mixer. The smooth, creamy, fluffed product was immediately spread on bakery products, and the coating of fluffed product dehydrated on the surface to form an excellent icing.

In repetitions of Example 2 the product was immediately packaged in closed containers. Dehydration is prevented and the product may be stored (preferably in a refrigerator) indefinitely for use as a spread.

EXAMPLE 3

*Maple confection.*—The procedure of Example 2 was followed with the exception that the mixture was blended for 8 minutes. The fluffed product was soft and spongy. Portions were dropped in small mounds on to waxed surface. Surface dehydration occured. The result was a delightful confection having a soft fondant center within a thin-walled, hardened covering.

Examples 4 to 6 illustrate the use of dry mixes in preparing the fluffed products of the present invention. The dry mixes are prepared with the proper ratios of sugar and monoglyceride for combining with a calculated amount of water. Dry mixes have many advantages in regard to packaging, transporting, and storing over products containing water.

EXAMPLE 4

*Maple icing.*—The dry mix was prepared by combining 200 grams maple sugar and 3 grams monoglyceride and thoroughly mixing these ingredients. Water, 65 ml., was placed in a container, heated to boiling, the dry mix added with stirring, and heating continued with a lid on the container to prevent loss of water until the solids were completely dissolved. The syrup was allowed to cool slightly, then blended for a few minutes with a mixer at high speed. A soft, smooth-textured, light brown colored, fluffed product was obtained.

EXAMPLE 5

*Maple icing (maple-cane sugar).*—The dry mix was prepared from 77 grams maple sugar, 50 grams sucrose, and 1.5 grams monoglyceride. Following the procedure of Example 4, the dry mix was dissolved in 40 ml. water, cooled, and blended. The product was similar to that of Example 4.

EXAMPLE 6

*Cane sugar icing.*—This example varied from Example 4 in that 200 grams cane sugar was used in the dry mix in place of maple sugar. The fluffed product was smooth, creamy and bland flavored.

A further variation of the practice of the present invention is illustrated in the following example.

EXAMPLE 7

*Corn syrup topping.*—The commercial syrup had a sugar content of 75.5%. Syrup, 400 grams, and 4 grams of monoglyceride were combined, heated to about 150° F. with gentle stirring, and blended for 2 minutes. A smooth, creamy, fluffed product was obtained.

The compositions of Examples 6 and 7 provide a base to which flavors and coloring agents may be added to obtain fluffed products for numerous uses.

The foregoing examples are presented to illustrate the invention and are not intended to be in limitation thereof.

We claim:

A process for the preparation of a fluffed product from maple syrup comprising heating a maple syrup at a temperature in the range of about 16 to 17° F. above the boiling point of water to concentrate it to about 75% sugar, admixing the resulting hot concentrated syrup with about 1% by weight of a substantially pure monoglyceride selected from the group consisting of monoglycerides of saturated and unsaturated monocarboxylic fatty acids having 12 to 20 carbon atoms and mixtures thereof, allowing the resulting mixture to cool to about 155° F., and blending the mixture with incorporation of air until the desired consistency is obtained.

References Cited by the Examiner
UNITED STATES PATENTS

| | | | |
|---|---|---|---|
| 1,908,454 | 5/33 | Snider | 99—146 |
| 2,052,358 | 8/36 | Lund | 99—146 |
| 2,619,423 | 11/52 | Diamond | 99—139 XR |

OTHER REFERENCES

Ser. No. 296,157, Herlow (A.P.C.), published May 4, 1943 (abandoned).

Bennett: "Mono- and Di-Glycerides—Their Use in Food Manufacture," Food Manufacture, July 5, 1940.

A. LOUIS MONACELL, *Primary Examiner.*

BEATRICE H. STRIZAK, WILLIAM B. KNIGHT, *Examiners.*